(12) United States Patent
Yamamoto

(10) Patent No.: US 8,272,742 B2
(45) Date of Patent: Sep. 25, 2012

(54) SINGLE PROJECTION DISPLAY DEVICE HAVING HIGH PORTABILITY

(75) Inventor: Chikara Yamamoto, Saitama (JP)

(73) Assignee: Fujifilm Corporation, Tokyo (JP)

( * ) Notice: Subject to any disclaimer, the term of this patent is extended or adjusted under 35 U.S.C. 154(b) by 388 days.

(21) Appl. No.: 12/569,663

(22) Filed: Sep. 29, 2009

(65) Prior Publication Data
US 2010/0091247 A1 Apr. 15, 2010

(30) Foreign Application Priority Data
Oct. 10, 2008 (JP) ................. P2008-263913

(51) Int. Cl.
*G03B 21/14* (2006.01)
(52) U.S. Cl. ........................................... 353/20
(58) Field of Classification Search ............ 353/20, 353/33, 81; 359/483.01–494.01
See application file for complete search history.

(56) References Cited

U.S. PATENT DOCUMENTS

| | | | | |
|---|---|---|---|---|
| 5,317,348 A | * | 5/1994 | Knize | 353/31 |
| 5,526,184 A | * | 6/1996 | Tokuhashi et al. | 359/630 |
| 6,222,677 B1 | * | 4/2001 | Budd et al. | 359/630 |
| 7,009,670 B1 | * | 3/2006 | Huang et al. | 349/117 |
| 2008/0062519 A1 | * | 3/2008 | Facius | 359/483 |

FOREIGN PATENT DOCUMENTS

| JP | 2001-201793 A | 7/2001 |
|---|---|---|
| JP | 2001-281614 A | 10/2001 |

* cited by examiner

*Primary Examiner* — Georgia Y Epps
*Assistant Examiner* — Renee Naphas
(74) *Attorney, Agent, or Firm* — Birch, Stewart, Kolasch & Birch, LLP

(57) ABSTRACT

Linearly polarized illumination light that is emitted from a light source unit and then reaches a polarized light separation plane along the optical axis of an illumination optical unit is reflected from the polarized light separation plane at a right angle and reaches a reflection optical unit. The reflection optical unit reverses the phase of the linearly polarized illumination light and reflects the illumination light to the polarized light separation plane. The illumination light passes through the polarized light separation plane and reaches a reflective liquid crystal display device. The reflective liquid crystal display device converts the illumination light into modulated light having image information thereon. In this case, the phase of the linearly polarized light is reversed again and reflected from the polarized light separation plane at a right angle to reach a projection lens. The light is enlarged and projected onto a screen.

18 Claims, 7 Drawing Sheets

EXAMPLE 1

EXAMPLE 1

EXAMPLE 2

EXAMPLE 3

EXAMPLE 4

SINGLE PROJECTION DISPLAY DEVICE HAVING HIGH PORTABILITY

CROSS-REFERENCE TO RELATED APPLICATIONS

This application is based upon and claims the benefit of priority from the Japanese Patent Application No. 2008-263913 filed on Oct. 10, 2008; the entire contents of which are incorporated herein by reference.

BACKGROUND OF THE INVENTION

1. Field of the Invention

The present invention relates to a projection image display device that enlarges and projects an image displayed on a reflective light valve onto a screen, and more particularly, to a single projection display device that has high portability and can be held in one hand.

2. Description of the Related Art

In recent years, there has been a demand for projectors including a handheld-type single projection display device having high portability.

Particularly, among the handheld-type projectors, a projector that is sufficiently small so as to be held in one hand, like a flashlight or a penlight, and can project an image on a desired place (for example, a wall or a ceiling) is convenient.

A reflective light valve, such as a reflective liquid crystal device (LCOS) or a DMD (digital micro device), has been known as a light valve that has been used for the projector. The reflective light valve can increase an aperture ratio, as compared to a transmissive light valve, and can meet demands for high resolution and high illuminance. In addition, the reflective light valve can facilitate a reduction in the size of a device.

As the reflective liquid crystal display device capable of improving the portability of a device, for example, a projection display device shown in FIG. 6 has been proposed which uses a so-called color quad (an optical system obtained by combining a wavelength-selective polarization rotator that rotates polarized light in a predetermined wavelength band and a PBS prism) 460 and three reflective liquid crystal display devices 424a, 424b, and 424c to project an image onto a screen through a projection lens 426 (this type of projection display device is disclosed in JP-A-2001-281614).

For example, a single projection display device shown in FIG. 7 has been proposed which uses one reflective liquid crystal display device 524 and a polarizing prism 514 having a polarized light separation plane 516 to project an image onto a screen through a projection lens 526 (this type of projection display device is disclosed in JP-A-2001-201793).

However, of the projection display devices according to the related art, the projection display device shown in FIG. 6 (for example, JP-A-2001-281614) includes three light valves, which are the reflective liquid crystal display devices 424a, 424b, and 424c, and uses a so-called color quad 460. Therefore, the width of an intermediate part between the front part including a light source unit 401 and an illumination optical unit (which includes, for example, a fly-eye 406, a comb type filter 408, and a field lens 410) and the rear part including the projection lens 426 is significantly increased, which makes it difficult to significantly reduce the size of a device. Therefore, the projection display device is not suitable for a straight type device that is sufficiently small to be held in one hand, such as a flashlight or a penlight.

Of the projection display devices according to the related art, the projection display device shown in FIG. 7 (for example, JP-A-2001-201793) includes a single light valve, which is the reflective liquid crystal display device 524, but the optical axis $X_1$ of a light source unit 501 and an illumination optical unit (which includes, for example, a fly-eye 506, a comb type filter 508, and a field lens 510) is bent at a right angle with respect to the optical axis $X_2$ of the projection lens 526 in the polarized light separation plane 516. Therefore, the projection display device is not suitable for a straight type device that is sufficiently small to be held in one hand.

SUMMARY OF THE INVENTION

The invention has been made in order to solve the above-mentioned problems, and an object of the invention is to provide a straight-type single projection display device that uses one reflective light valve to reduce the overall size of a device such that the device can be held in one hand, like a flashlight or a penlight.

According to an aspect of the invention, a single projection display device includes a light source, a reflective light valve, a polarized light separation plane, a reflection optical unit and a projection lens. The reflective light valve is illuminated with illumination light emitted from the light source and emits modulated light corresponding to a predetermined image signal. The polarized light separation plane reflects the illumination light, which is in a predetermined linear polarization state, in a direction perpendicular to a traveling direction of the illumination light being incident on the polarized light separation plane and reflects the modulated light converted into the predetermined linearly polarized light by the reflective light valve in a direction perpendicular to a traveling direction of the modulation light being incident on the polarized light separation plane. The reflection optical unit reflects the linearly polarized illumination light, which is reflected by the polarized light separation plane, toward the reflective light valve, which is provided opposite to the reflection optical unit across the polarized light separation plane, while rotating a phase of the linearly polarized illumination light by 180 degrees. The projection lens enlarges and projects image information carried on the modulated light from the polarized light separation plane.

In the single projection display device according to the above-mentioned aspect, an optical axis of an illumination optical unit that guides the illumination light to the polarized light separation plane may be parallel to an optical axis of the projection lens.

The single projection display device according to the above-mentioned aspect may further include a polarizing plate that is provided between the polarized light separation plane and the projection lens and regulates a degree of polarization (e.g., a direction of an oscillation plane of polarized light).

The reflection optical unit may include a reflecting mirror and a quarter-wave plate that is provided on a surface of the reflecting mirror facing the polarized light separation plane.

The reflecting mirror of the reflection optical unit may be a concave mirror having a concave surface directed to the polarized light separation plane. The reflecting mirror of the reflection optical unit may include a positive lens having a surface which has a reflecting coat formed thereon and which is directed to an opposite side to the polarized light separation plane.

The reflection optical unit may include a reflective liquid crystal display device.

The light source unit may include an LED or a laser.

The projection lens may satisfy Conditional expressions 1 and 2 given below:

$20 < S/OBJ < 65$, and  [Conditional expression 1]

$2.5 < \beta/S < 10.0$  [Conditional expression 2]

where S indicates a maximum length (inch) of a magnification-side image, OBJ indicates a magnification-side projection distance (m), and β indicates a magnifying power.

The projection lens may satisfy Conditional expressions 1', 2, and 3 given below:

$35 < S/OBJ < 140$,  [Conditional expression 1']

$2.5 < \beta/S < 10.0$, and  [Conditional expression 2]

$3.0 < S < 10.0$  [Conditional expression 3]

where S indicates a maximum length (inch) of a magnification-side image, OBJ indicates a magnification-side projection distance (m), and β indicates a magnifying power.

According to the single projection display device of the above-mentioned aspect of the invention, linearly polarized illumination light that is emitted from the light source unit and then reaches the polarized light separation plane along the optical axis of the illumination optical unit is reflected by the polarized light separation plane in a direction perpendicular to a traveling direction of the linearly polarized illumination light being incident on the polarized light separation plane and reaches the reflection optical unit provided on polarized light separation plane side. The reflection optical unit rotates the phase of the incident linearly polarized light by 180 degrees and reflects the illumination light to the polarized light separation plane. Since the phase of the linearly polarized illumination light is rotated 180 degrees, the linearly polarized illumination light passes through the polarized light separation plane and reaches the reflective light valve provided opposite to the reflection optical unit across the polarized light separation plane. In the reflective light valve, the phase of the illumination light is rotated by 180 degrees, and the illumination light is converted into modulated light having image information thereon and is then reflected to the polarized light separation plane. Since the phase of the modulated light, which is in the predetermined linear polarization state and has been reflected by the reflective light valve is rotated by 180 degrees again, the modulated light is then reflected by the polarized light separation plane in a direction perpendicular to a traveling direction of the modulated light being incident on the polarized light separation plane and reaches the projection lens. The image information carried on the modulated light is enlarged and projected by the projection lens.

As such, in the single projection display device according to the above-mentioned aspect of the invention, the reflection optical unit is provided on the polarized light separation plane side so as to be opposite to the reflective light valve. The reflection optical unit reflects the incident linearly polarized illumination light toward the reflective light valve while rotating the phase of the illumination light by 180 degrees. In this way, it possible to align the optical axis of the illumination optical unit and the optical axis of the projection lens to constitute a straight line as a whole.

In addition, a single reflective light valve capable of reducing the overall size of a device is used. Therefore, it is easy to achieve a straight-type single projection display device that is sufficiently small to be held in one hand, like a flashlight or a penlight.

DESCRIPTION OF THE PREFERRED EMBODIMENTS

Hereinafter, exemplary embodiments of the invention will be described with reference to the accompanying drawings.

EXAMPLE 1

Figure 1:
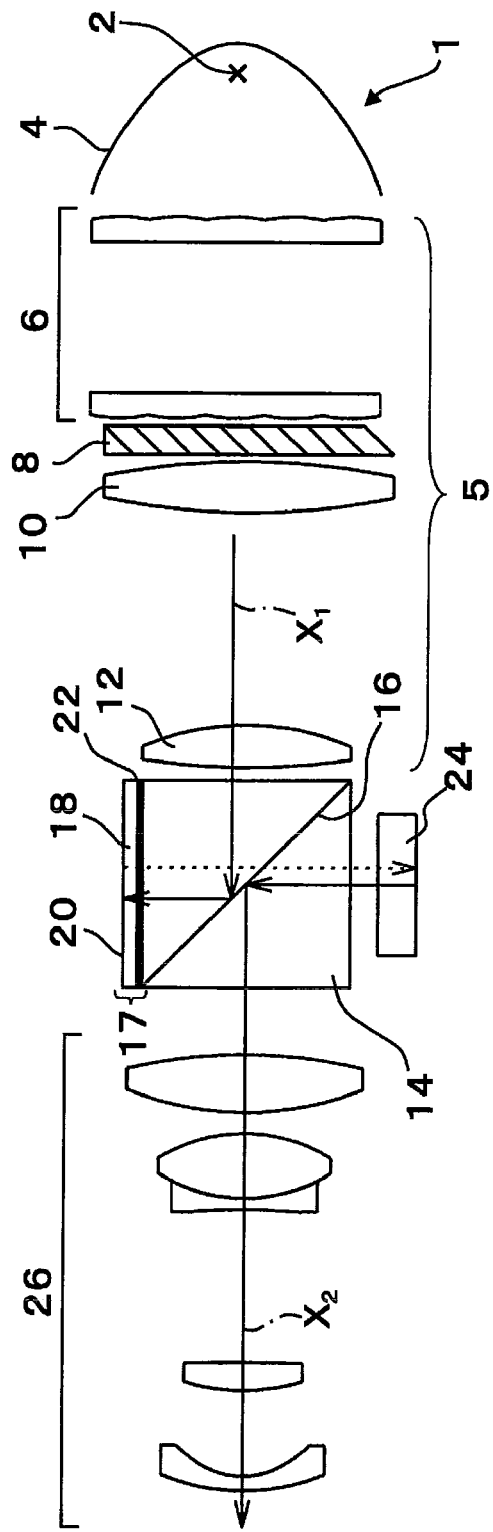
FIG. 1 is a diagram schematically illustrating the optical arrangement of a single projection display device according to Example 1.

FIG. 1 is a diagram schematically illustrating a single projection display device according to Example 1 of the invention.

The single projection display device includes a light source unit 1, one reflective liquid crystal display device (hereinafter, referred to as an LCOS) 24, a polarized light separation plane 16, a reflection optical unit 17 and a projection lens 26. The one reflective liquid crystal display device 24 is illuminated with illumination light emitted from the light source unit 1 and emits modulated light corresponding to an image signal. The polarized light separation plane 16 reflects linearly polarized illumination light in a direction perpendicular to a traveling direction of the illumination light being incident on the polarized light separation plane 16. The polarized light separation plane 16 also reflects the modulated light, which is in a linear polarization state, in a direction perpendicular to a traveling direction of the modulated light being incident on the polarized light separation plane 16. The reflection optical unit 17 reflects the illumination light reflected by the polarized light separation plane 16 toward the reflective liquid crystal display device 24, which is provided opposite to the reflection optical unit 17 across the polarized light separation plane 16, while rotating the phase of the linearly polarized light by 180 degrees (while revering the phase of the linearly polarized light). The projection lens 26 enlarges and projects image information carried on the modulated light reflected from the polarized light separation plane 16.

The light source unit 1 includes a light-emitting member 2 and a reflector 4 such as a paraboloidal mirror. An illumination optical unit 5 is provided on the rear side of the light source unit 1. The illumination optical unit 5 includes a fly-eye integrator 6 that uniformizes illumination light, a polarizing element (comb type filter) 8 that aligns one of two linearly polarized light components having oscillation planes orthogonal to each other with the other linearly polarized light component, and emits the two linearly polarized light components, and a pair of field lenses (condenser lenses) 10 and 12. In the single projection display device according to Example 1, the polarized light separation plane 16 is provided in a polarizing prism 14, and the reflection optical unit 17 includes a flat reflecting mirror 18 having one surface opposite to the polarizing prism 14 as a reflecting surface 20 and a quarter-wave plate 22 that is provided on the other surface of the flat reflecting mirror 18 facing the polarizing prism 14.

Next, the optical path of the single projection display device having the above-mentioned structure according to Example 1 will be described. Linearly polarized (for example, S-polarized) illumination light, which is emitted from the light source unit 1 and then reaches the polarized light separation plane 16 along the optical axis $X_1$ of the illumination optical unit 5, is reflected by the polarized light separation plane 16 in a direction perpendicular to a traveling direction of the illumination light being incident on the polarized light separation plane 16 and then reaches the reflection optical unit (the reflecting mirror 18 and the quarter-wave plate 22) 17 provided on the side of the polarized light separation plane 16. In the reflection optical unit 17, the incident linearly polarized light passes through the quarter-wave plate 22 twice and is then emitted therefrom. Therefore, the phase of the polarized light is rotated 180 degrees (for example, S-polarized light is converted into P-polarized light), and the illumination light is reflected to the polarized light separation plane 16. In this case, the phase of the illumination light incident from the illumination optical unit 5 is rotated by 180 degrees by the reflection optical unit and becomes linearly polarized light. The linearly polarized light passes through the polarized light separation plane 16 and reaches the reflective liquid crystal display device 24. The reflective liquid crystal display device 24 converts the illumination light into modulated light having image information thereon. In this case, the phase of the linearly polarized light is rotated 180 degrees again (for example, the P-polarized light is converted into the S-polarized light) and then reflected to the polarized light separation plane 16. In this way, the modulated light is reflected by the polarized light separation plane 16 in a direction perpendicular to a traveling direction of the modulated light being incident on the polarized light separation plane 16 and reaches the projection lens 26. Then, the modulated light travels along the optical axis $X_2$ of the projection lens and is enlarged and projected onto a screen (not shown).

In the single projection display device having the above-mentioned structure according to Example 1, particularly, the reflection optical unit 17 is provided on the side of the polarized light separation plane 16 (polarizing prism 14) and reflects the illumination light incident from the polarized light separation plane 16 to the reflective liquid crystal display device 24 provided opposite to the reflection optical unit 17 across the polarized light separation plane 16, thereby rotating the phase of the incident linearly polarized light by 180 degrees. In this way, it is possible to align the optical axis $X_1$ of the illumination optical unit 5 and the optical axis $X_2$ of the projection lens 26 in a substantially straight line (the optical axes are at least parallel to each other). As a result, it is possible to achieve a straight-type single projection display device which is sufficiently small to be held in the hand, like a flashlight or a penlight.

Figure 5:
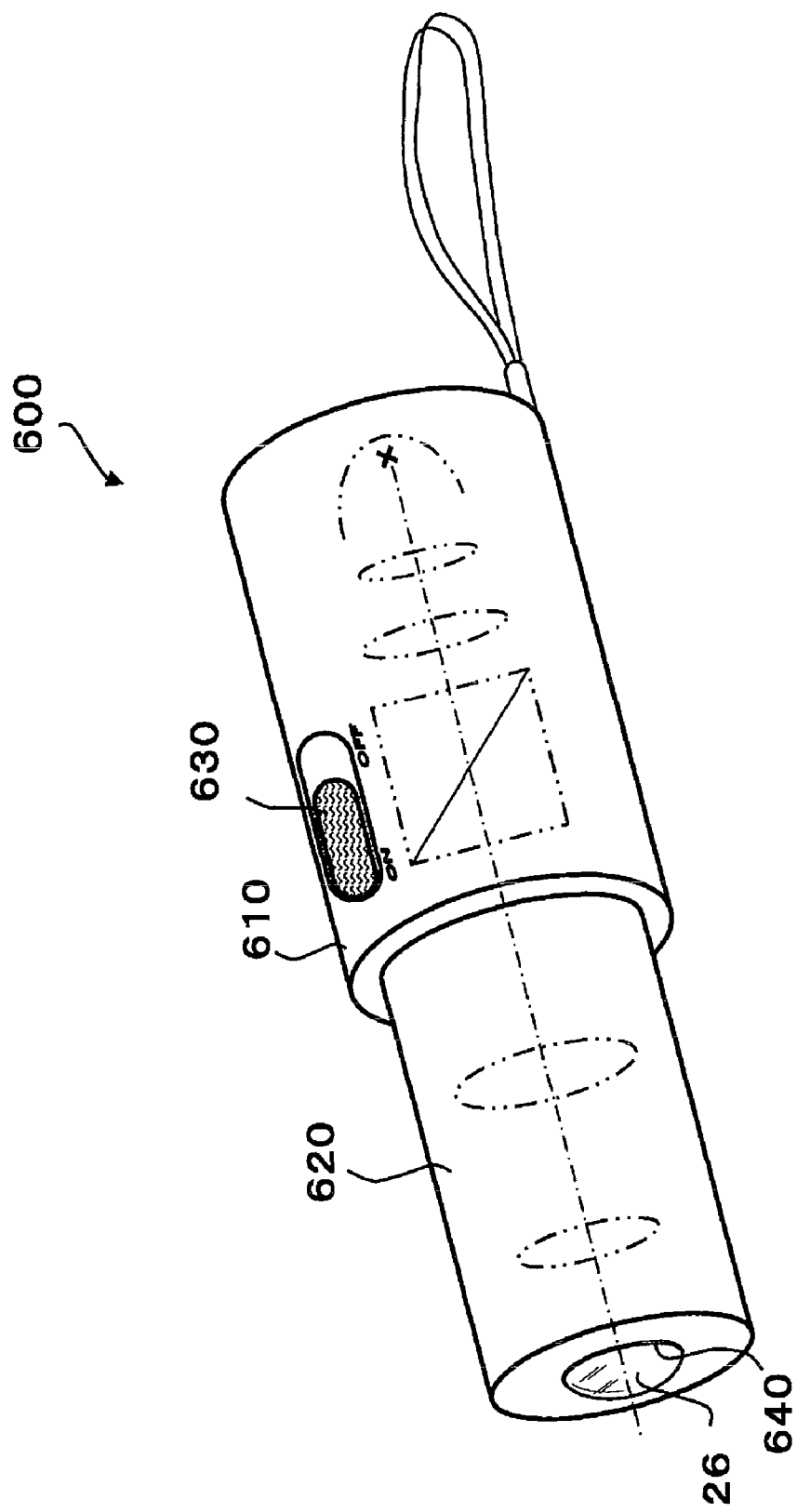
FIG. 5 is a conceptual diagram illustrating the appearance of the single projection display device according to Example 1.
Figure 6:
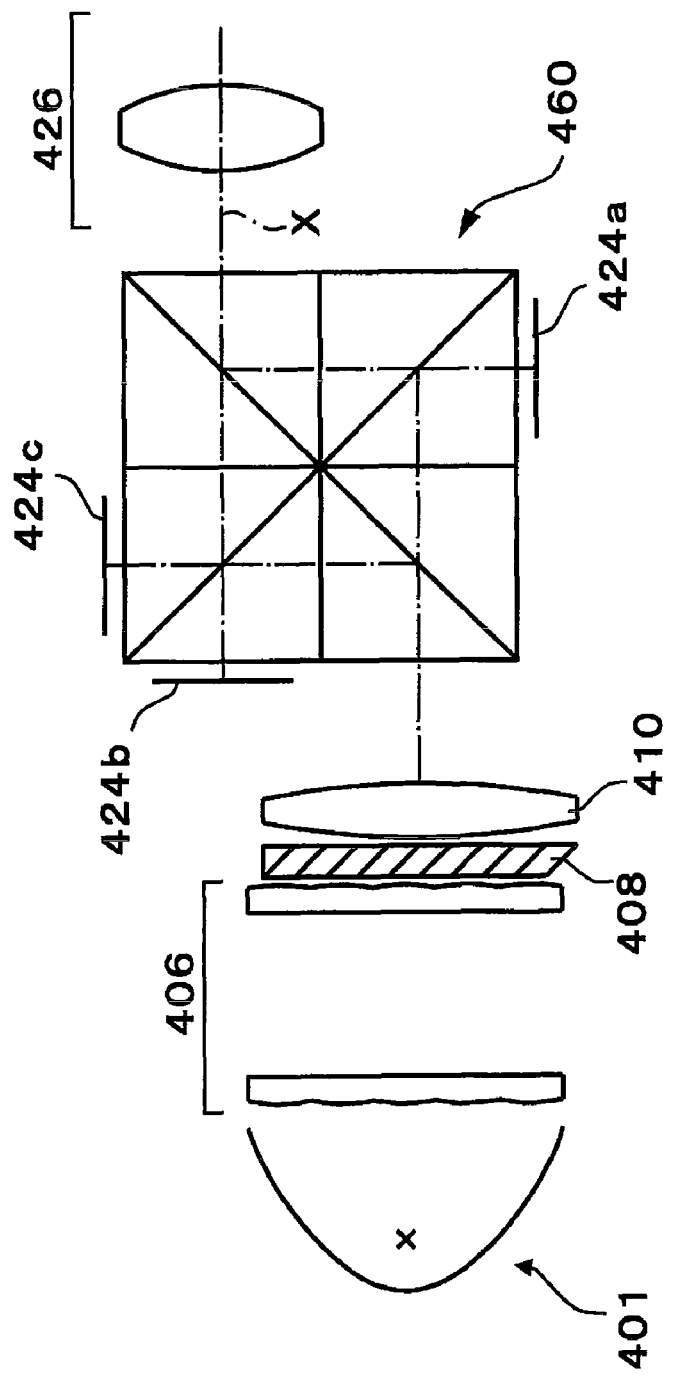
FIG. 6 is a diagram schematically illustrating the optical arrangement of a projection display device according to a first related art.
Figure 7:
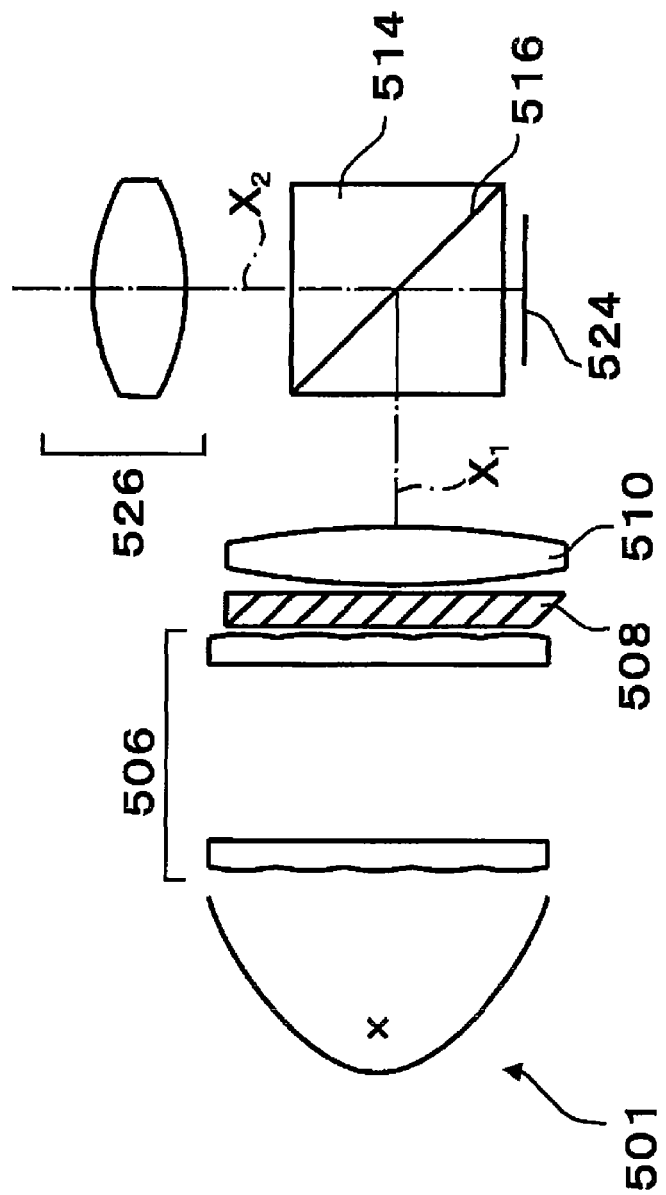
FIG. 7 is a diagram schematically illustrating the optical arrangement of a projection display device according to a second related art.

FIG. 5 is a diagram schematically illustrating the appearance of the straight-type single projection display device having the above-mentioned structure. That is, a single projection display device 600 includes a holding portion 610, a barrel portion 620 that protrudes from the holding portion 610 to the front side, and a main switch 630 that is provided on the surface of the holding portion 610. The light source unit 1 and the illumination optical unit 5 are provided in the barrel portion 620. A through hole 640 through which projection light is emitted is provided in the front surface of the barrel portion 620, and the projection lens 26 is provided in the through hole.

A wire or wireless communication method may be used to supply image signals to the reflective liquid crystal display device 24 of the single projection display device. In addition, image information may be read from a USB or a memory card and the read image information may be supplied.

In addition, image information received from a mobile phone in the vicinity of the single projection display device may be transmitted to the single projection display device by a cable or a wireless communication method, such as Bluetooth. Alternatively, a communication unit provided in the single projection display device may acquire image information and the image information may be supplied to the reflective liquid crystal display device 24.

EXAMPLE 2

Figure 2:
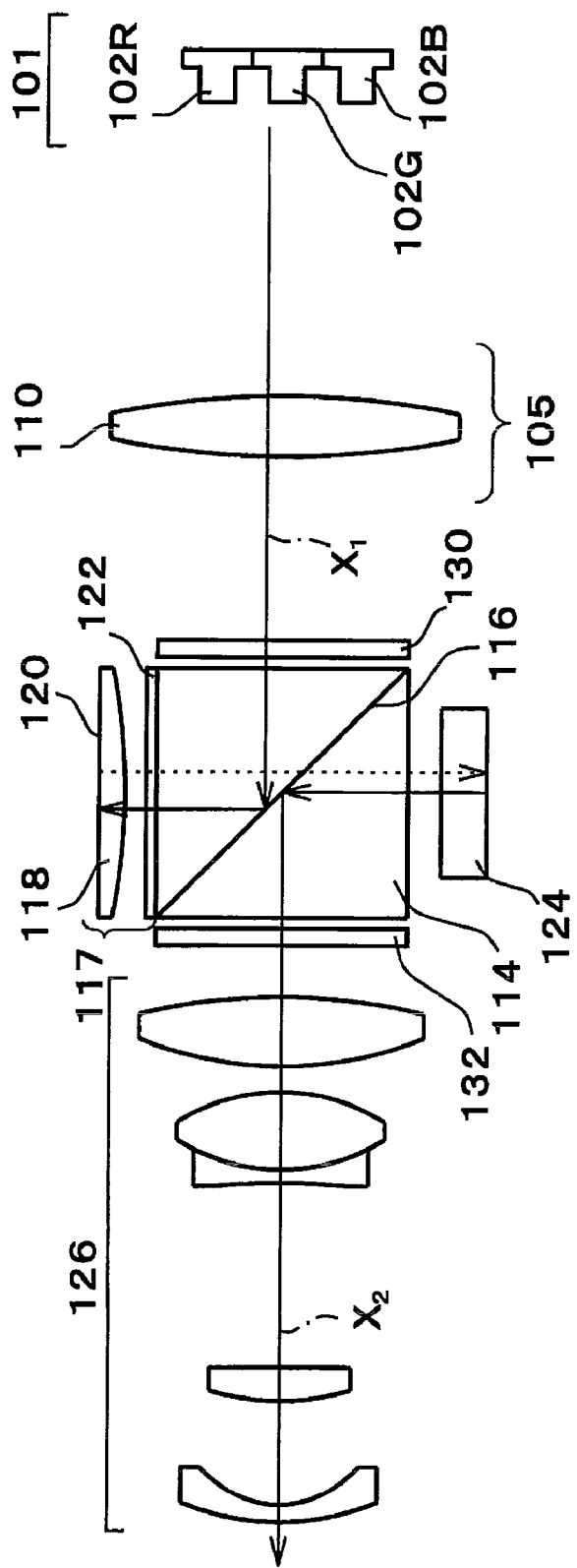
FIG. 2 is a diagram schematically illustrating the optical arrangement of a single projection display device according to Example 2.

FIG. 2 is a diagram schematically illustrating the structure of a single projection display device according to Example 2 of the invention.

The basic structure, operation, and effect of the single projection display device according to Example 2 are substantially the same as those of the single projection display device according to Example 1. Therefore, members having the same functions as those in Example 1 are denoted by reference numerals obtained by adding 100 to the reference numerals of the members in Example 1, and members having different functions from those in Example 1 will be mainly described.

The single projection display device according to Example 2 is different from that according to Example 1 in that a light-emitting member of a light source unit 101 includes LEDs 102R, 102G, and 102B that respectively emit R, G, and B light components and an illumination optical unit 105 includes only a field lens 110. In FIG. 2 schematically illustrating the LEDs 102R, 102G, and 102B, the number of each color LED is not limited to 1, but a plurality of sets of R, G, and B LEDs may be provided. In addition, the single projection display device according to Example 2 is different from that according to Example 1 in that a reflecting mirror of a reflection optical unit 117 is obtained by forming a reflecting surface 120 on one surface (flat surface) of a positive lens 118 opposite to a polarized light separation plane 116 (and a polarizing prism 114) and polarizing plates 130 and 132 are provided around the polarizing prism 114 so as to face the light source unit 101 and a projection lens 126. The polarizing plate 130 regulates the oscillation plane of linearly polarized light such that illumination light emitted from the light source unit 101 is reflected and linearly polarized by the polarized light separation plane 116. The polarizing plate 132 regulates the oscillation plane of the linearly polarized light in order to increase the contrast of a projection image.

EXAMPLE 3

Figure 3:
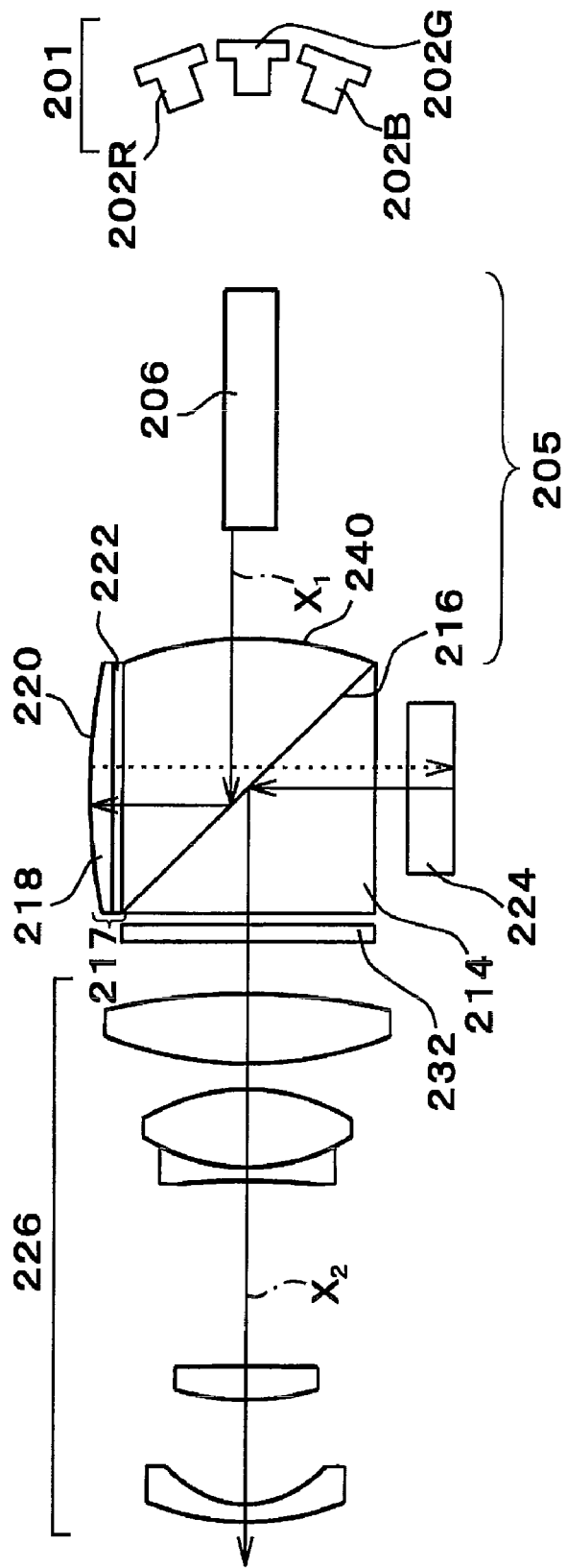
FIG. 3 is a diagram schematically illustrating the optical arrangement of a single projection display device according to Example 3.

FIG. 3 is a diagram schematically illustrating the structure of a single projection display device according to Example 3 of the invention.

The basic structure, operation, and effect of the single projection display device according to Example 3 are substantially the same as those of the single projection display devices according to Examples 1 and 2. Therefore, members having the same functions as those in Examples 1 and 2 are denoted by reference numerals obtained by adding 200 to the reference numerals of the members in Example 1, and members having different functions from those in Examples 1 and 2 will be mainly described.

The single projection display device according to Example 3 is different from those according to Examples 1 and 2 in that a light-emitting member of a light source unit 201 includes LEDs 202R, 202G, and 202B that are arranged in an arc shape so as to emit R, G, and B illumination light components to the center of the curvature of the arc and an incident surface of a rod integrator 206 is arranged at the center of the curvature. The rod integrator 206 is used to mix the illumination light components emitted from the LEDs 202R, 202G, and 202B and to obtain uniform light. In addition, instead of the field lens 12 in Example 1, an illumination light incident surface of a polarizing prism 240 is a convex surface facing the light source unit 201. A reflection optical unit 217 is similar to that in Example 2 in that the reflection optical unit 217 is composed of a positive lens 218 having a quarter-wave plate 222 and a reflecting surface 220, but is different therefrom in that the reflecting surface 220 is a concave mirror having a concave surface facing the polarizing prism 214. The concave mirror focuses the illumination light. A polarizing plate 232 has the same function as the polarizing plate 132 according to Example 2.

EXAMPLE 4

Figure 4:
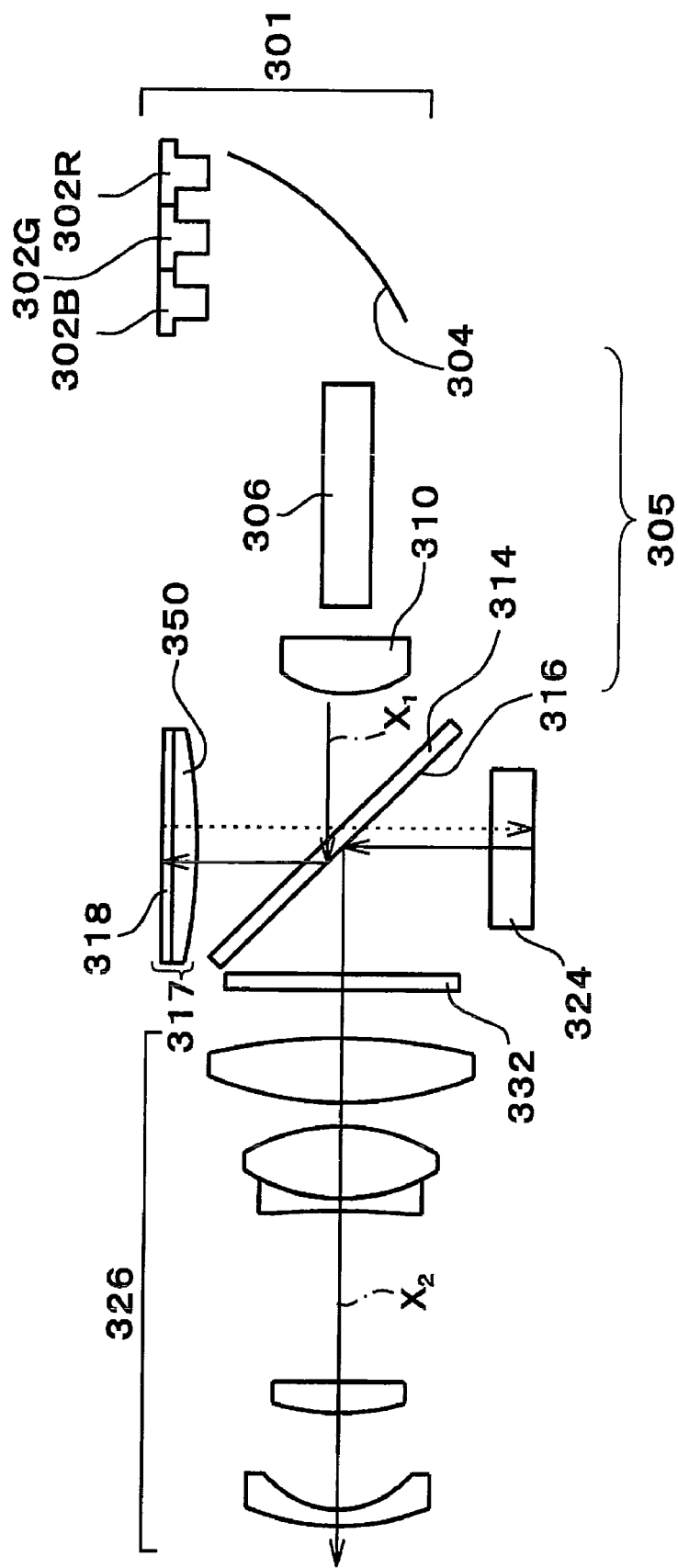
FIG. 4 is a diagram schematically illustrating the optical arrangement of a single projection display device according to Example 4.

FIG. 4 is a diagram schematically illustrating the structure of a single projection display device according to Example 4 of the invention.

The basic structure, operation, and effect of the single projection display device according to Example 4 are substantially the same as those of the single projection display devices according to Examples 1 to 3. Therefore, members having the same functions as those in Examples 1 to 3 are denoted by reference numerals obtained by adding 300 to the reference numerals of the members in Example 1, and members having different functions from those in Examples 1 to 3 will be mainly described.

The single projection display device according to Example 4 is different from those according to Examples 1 to 3 in that a light-emitting member of a light source unit 301 includes LEDs 302R, 302G, and 302B that emit R, G, and B illumination light components, the emitted R, G, and B illumination light components are reflected by a concave mirror 304 and are then incident on an incident surface of a rod integrator 306, the rod integrator 306 mixes the R, G, and B illumination light components to obtain uniform illumination light, the uniform illumination light is incident on a polarized light separation plane 316 through a field lens 310, and the polarized light separation plane 316 is provided on one surface of a polarized light separation plate 314 facing a projection lens 326. In Example 4, the optical axis from the light source unit 301 to a reflector 304 is bent from the optical axis $X_1$ of the illumination optical unit 305. However, when the single projection display device is a substantially straight type in which most of the optical axis $X_1$ of the illumination optical unit 305 is parallel to most of the optical axis $X_2$ of the projection lens 326, the single projection display device is also included in the invention.

In addition, the single projection display device according to Example 4 is different from those according to Examples 1 to 3 in that a reflection optical unit 317 includes a reflective liquid crystal display device 318 (including a positive lens 350). The reflective liquid crystal display device 318 serves as a reflecting mirror and a quarter-wave plate. Therefore, the reflective liquid crystal display device 318 is provided instead of them.

<Other Common Structures>

Each of the single projection display devices according to Examples 1 to 4 includes a single reflective liquid crystal display device, and various methods of projecting color images using the single reflective liquid crystal display device may be used. For example, a light-emitting member of a light source unit may sequentially emit R, G, and B light components, and corresponding color images may be displayed on the reflective liquid crystal display device in synchronization with the emission of the light components.

In this case, it is preferable to provide a CPU (not shown) for synchronizing the emission timing of light from the light-emitting member with the display timing of an image on the reflective liquid crystal display device.

It is preferable that the single projection display device according to any one of Examples 1 to 4 satisfy Conditional expressions 1 and 2 given below:

$$20 < S/OBJ < 65, \text{ and} \quad \text{[Conditional expression 1]}$$

$$2.5 < \beta/S < 10.0 \quad \text{[Conditional expression 2]}$$

(where S indicates the maximum length (inch) of a magnification-side image, OBJ indicates a magnification-side projection distance (m), and $\beta$ indicates a magnifying power).

If the ratio is beyond the range of Conditional expression 1, it is difficult to appropriately set a projection screen size and a projection distance.

That is, if the ratio is greater than the upper limit of Conditional expression 1, the projection size is excessively large, resulting in a dark image, or the projection distance is too small for many people to view the projection screen at the same time. On the other hand, if the ratio is less than the lower limit, the projection size is too small to obtain the effect of magnification projection, or the projection distance is excessively large, resulting in a dark image.

Conditional expression 2 means that a panel size of 0.1 inch to 0.4 inch is used when all aberrations are not considered. In recent years, liquid crystal display panels having a size of 0.6 to 0.7 inch or 1.3 inches have been generally used. Therefore, a liquid crystal display panel having a diagonal size that is half or less of the above-mentioned size is required.

If the ratio is beyond the range of Conditional expression 2, it is difficult to prevent an increase in the size of a device and improve illumination efficiency and the resolution of a screen. That is, if the ratio is greater than the upper limit of Conditional expression 2, illumination efficiency is lowered according to the Etendue theory, or it is difficult to obtain a high-resolution screen. On the other hand, if the ratio is less than the lower limit, the size of a device increases, and it is difficult to manufacture a projection display device having high portability.

When Conditional expressions 1 and 2 are satisfied, it is possible to manufacture a projection display device that projects a projection image having a size of, for example, 20 to 40 inches onto the screen that is about 1 m away from the projection display device.

When a projection display device that has a screen integrated thereinto having a small size and projects a projection image having a size of about 3 to 10 inches is manufactured, it is preferable that the projection display device satisfy Conditional expressions 1', 2, and 3 given below, instead of Conditional expressions 1 and 2:

$$35 < S/OBJ < 140, \quad \text{[Conditional expression 1']}$$

2.5<β/S<10.0, and [Conditional expression 2]

3.0<S<10.0 [Conditional expression 3]

(where S indicates the maximum length (inch) of a magnification-side image, OBJ indicates a magnification-side projection distance (m), and β indicates a magnifying power).

When Conditional expressions 1', 2, and 3 are satisfied, it is possible to achieve a handheld single projection display device having a very small size.

According to the single projection display device, it is possible to obtain the effect of preventing an increase in the size of a device and improving illumination efficiency and the resolution of a screen by Conditional expression 1', which is the same effect as that in Conditional expression 1, and the effect of appropriately setting the projection screen size and the projection distance by Conditional expression 2.

If Conditional expression 3 is not satisfied, it is difficult to obtain an appropriate light valve size. That is, when Conditional expression 3 is satisfied, the size of the light valve is not excessively small, and a projection image is not excessively dark.

Any structure may be used as long as it can obtain substantially the same operation as the above-described embodiment even when a mirror is provided on the optical path between the polarized light separation plane and the reflective liquid crystal display device. This structure is also included in the above-described embodiment.

The single projection display device according to the invention is not limited to the above-described examples, but various modifications and changes of the invention can be made. The light valve or the illumination optical unit is not limited to the above-mentioned structure, but other suitable structures may be used.

Instead of the reflective liquid crystal display device, other reflective light valves, such as a DMD, may be used.

An LED or a semiconductor laser may be used as the light-emitting member of the light source unit. In this case, it is possible to reduce the size of a device. Other kinds of lasers or other kinds of light sources may also be used.

The illumination light may be linearly polarized while being emitted from the light source, or it may be linearly polarized after being emitted from the light source.

What is claimed is:

1. A single projection display device comprising:
a light source;
a reflective light valve that is illuminated with illumination light emitted from the light source and emits modulated light corresponding to an image signal;
a polarized light separation plane that reflects the illumination light, which is in a predetermined linear polarization state, in a direction perpendicular to a traveling direction of the illumination light being incident on the polarized light separation plane and reflects the modulated light, which is caused by the reflective light valve to be in the predetermined linear polarization state, in a direction perpendicular to a traveling direction of the modulation light being incident on the polarized light separation plane;
a reflection optical unit that reflects the linearly polarized illumination light, which is reflected by the polarized light separation plane, toward the reflective light valve, which is provided opposite to the reflection optical unit across the polarized light separation plane, while rotating a phase of the linearly polarized illumination light by 180 degrees; and
a projection lens that enlarges and projects image information carried on the modulated light from the polarized light separation plane,
wherein the projection lens satisfies the following conditional expressions:

20<S/OBJ<65, and 2.5<β/S<10.0 where S indicates a maximum length (inch) of a magnification-side image, OBJ indicates a magnification-side projection distance (m), and β indicates a magnifying power.

2. The single projection display device according to claim 1,
wherein an optical axis of an illumination optical unit that guides the illumination light to the polarized light separation plane is parallel to an optical axis of the projection lens.

3. The single projection display device according to claim 1, further comprising:
a polarizing plate that is provided between the polarized light separation plane and the projection lens and regulates a direction of an oscillation plane of polarized light.

4. The single projection display device according to claim 1,
wherein the reflection optical unit includes a reflecting mirror and a quarter-wave plate that is provided on a surface of the reflecting mirror facing the polarized light separation plane.

5. The single projection display device according to claim 4,
wherein the reflecting mirror of the reflection optical unit is a concave mirror having a concave surface directed to the polarized light separation plane.

6. The single projection display device according to claim 4,
wherein the reflecting mirror of the reflection optical unit includes a positive lens having a surface which has a reflecting coat formed thereon and which is directed to an opposite side to the polarized light separation plane.

7. The single projection display device according to claim 1,
wherein the reflection optical unit includes a reflective liquid crystal display device.

8. The single projection display device according to claim 1,
wherein the light source unit includes an LED.

9. The single projection display device according to claim 1,
wherein the light source unit includes a laser.

10. A single projection display device comprising:
a light source;
a reflective light valve that is illuminated with illumination light emitted from the light source and emits modulated light corresponding to an image signal;
a polarized light separation plane that reflects the illumination light, which is in a predetermined linear polarization state, in a direction perpendicular to a traveling direction of the illumination light being incident on the polarized light separation plane and reflects the modulated light, which is caused by the reflective light valve to be in the predetermined linear polarization state, in a direction perpendicular to a traveling direction of the modulation light being incident on the polarized light separation plane;

a reflection optical unit that reflects the linearly polarized illumination light, which is reflected by the polarized light separation plane, toward the reflective light valve, which is provided opposite to the reflection optical unit across the polarized light separation plane, while rotating a phase of the linearly polarized illumination light by 180 degrees; and a projection lens that enlarges and projects image information carried on the modulated light from the polarized light separation plane, wherein the projection lens satisfies the following conditional expressions:

$35 < S/OBJ < 140$, $2.5 < \beta/S < 10.0$, and $3.0 < S < 10.0$ where S indicates a maximum length (inch) of a magnification-side image, OBJ indicates a magnification-side projection distance (m), and β indicates a magnifying power.

11. The single projection display device according to claim 10, wherein an optical axis of an illumination optical unit that guides the illumination light to the polarized light separation plane is parallel to an optical axis of the projection lens.

12. The single projection display device according to claim 11, further comprising:

a polarizing plate that is provided between the polarized light separation plane and the projection lens and regulates a direction of an oscillation plane of polarized light.

13. The single projection display device according to claim 10, wherein the reflection optical unit includes a reflecting mirror and a quarter-wave plate that is provided on a surface of the reflecting mirror facing the polarized light separation plane.

14. The single projection display device according to claim 13, wherein the reflecting mirror of the reflection optical unit is a concave mirror having a concave surface directed to the polarized light separation plane.

15. The single projection display device according to claim 13, wherein the reflecting mirror of the reflection optical unit includes a positive lens having a surface which has a reflecting coat formed thereon and which is directed to an opposite side to the polarized light separation plane.

16. The single projection display device according to claim 10, wherein the reflection optical unit includes a reflective liquid crystal display device.

17. The single projection display device according to claim 10, wherein the light source unit includes an LED.

18. The single projection display device according to claim 10, wherein the light source unit includes a laser.

* * * * *